United States Patent [19]

Daute et al.

[11] Patent Number: 5,688,989
[45] Date of Patent: Nov. 18, 1997

[54] POLYURETHANE FOAMS MODIFIED WITH NONIONIC SURFACTANTS

[75] Inventors: Peter Daute, Essen; Roland Gruetzmacher, Wuelfrath; Johann Klein, Duesseldorf; Hermann Kluth, Duesseldorf; Rainer Hoefer, Duesseldorf, all of Germany

[73] Assignee: Henkel Kommanditgesellschaft auf Aktien, Duesseldorf, Germany

[21] Appl. No.: 652,523

[22] PCT Filed: Nov. 24, 1994

[86] PCT No.: PCT/EP94/03890

§ 371 Date: Jul. 3, 1996

§ 102(e) Date: Jul. 3, 1996

[87] PCT Pub. No.: WO95/15349

PCT Pub. Date: Jun. 8, 1995

[30] Foreign Application Priority Data

Dec. 3, 1993 [DE] Germany ............... 43 41 264.5

[51] Int. Cl.⁶ .................................................. G08G 18/10
[52] U.S. Cl. ............ 560/26; 521/116; 521/159; 528/49; 528/59; 528/85; 560/330
[58] Field of Search .......... 560/26, 330; 528/49, 528/59, 85; 521/116, 159

[56] References Cited

U.S. PATENT DOCUMENTS

| | | | |
|---|---|---|---|
| 3,463,745 | 8/1969 | Hofrichter et al. | 260/2.5 |
| 3,865,762 | 2/1975 | Replquet et al. | 260/2.5 |
| 4,508,853 | 4/1985 | Kluth et al. | 521/107 |
| 4,742,087 | 5/1988 | Kluth et al. | 521/107 |

FOREIGN PATENT DOCUMENTS

| | | |
|---|---|---|
| 125 579 | 11/1984 | European Pat. Off. . |
| 256 355 | 2/1988 | European Pat. Off. . |
| 2 086 977 | 12/1971 | France . |
| 36 26 223 | 2/1988 | Germany . |
| 39 23 394 | 1/1991 | Germany . |
| 41 28 649 | 3/1993 | Germany . |
| 892 776 | 3/1962 | United Kingdom . |
| WO 91/01294 | 2/1991 | WIPO . |
| WO 93/05008 | 3/1993 | WIPO . |

OTHER PUBLICATIONS

Ullmanns Enzyklopädie der technischen Chemie, 4th Edition, vol. 19, p. 317 et seq., Verlag Chemie, Weinheim, 1980.
Ullmanns Enzyklopädie der technischen Chemie, 4th Edition, vol. 19, pp. 304–305, Verlag Chemie, Weinheim, 1980.
Ullmanns Enzyklopädie der technischen Chemie, 4th Edition, vol. 19, pp. 303 to 304, Verlag Chemie, Weinheim, 1980.

*Primary Examiner*—Morton Foelak
*Attorney, Agent, or Firm*—Ernest G. Szoke; Wayne C. Jaeschke; Real J. Grandmaison

[57] ABSTRACT

A polyurethane composition for the production of single-component polyurethane foams on dry or wet substrates, wherein the composition is the reaction product of a polyol with a molar excess of difunctional or polyfunctional isocyanates and wherein 10% to 80% by weight of the polyol has been replaced by a nonionic surfactant containing at least one hydroxyl group.

8 Claims, No Drawings

POLYURETHANE FOAMS MODIFIED WITH NONIONIC SURFACTANTS

BACKGROUND OF THE INVENTION

Field of the Invention

This invention relates to new polyurethane compositions modified with hydrophilic surfactants containing isocyanate-reactive functional groups for the production of fine-cell homogeneous polyurethane foams.

DISCUSSION OF RELATED ART

Prior Art

Polyurethane foams, more especially so-called one-component polyurethane foams, are known for example from Ullmanns Enzyklopädie der technischen Chemie, 4th Edition, Vol. 19, pages 317 et seq., Verlag Chemie, Weinheim. The foams in question are mixtures of isocyanate-terminated reaction products of polyols with difunctional or polyfunctional isocyanates, catalysts to accelerate the reaction, viscosity-reducing agents, blowing agents and other auxiliaries which—protected against moisture—are marketed in pressurized containers. When they are released from the pressurized containers, the mixtures foam through evaporation of the blowing agent and cure under the effect of moisture from the surrounding environment or from the atmosphere. Polyurethane foams are used, for example, for insulating domestic appliances, as an insulating material and for filling joints with foam in the building industry and as insulating materials.

They essentially contain polyols bearing several OH groups in the molecule, difunctional or polyfunctional isocyanates, blowing agents, flame-proofing agents and auxiliaries, such as catalysts and stabilizers.

The polyols used may be any of the polyether or polyester polyols typically used in polyurethane chemistry. A review of possible polyols can be found in Ullmanns Enzyklopädie der technischen Chemie, 4th Edition, Vol. 19, pages 304–5, Verlag Chemie, Weinheim. The production of inexpensive oleochemical polyols from renewable raw materials and their use for this purpose is also known, cf. German patent applications DE-A1 36 26 223 and DE-A1 41 28 649. The first application claims prepolymers based on oleochemical polyols which are obtained by ring opening of epoxidized triglycerides with alcohols and subsequent partial transesterification. The second application describes the lithium-salt-catalyzed ring opening of epoxides with nucleophiles, such as alcohols, optionally in conjunction with subsequent transesterification of the reaction products with other non-epoxidized triglycerides.

Hitherto, chlorofluorocarbons (CFC's) have often been used as blowing agents. On account of ecological objections to these compounds which damage the ozone layer, so-called partly halogenated hydrocarbons (HCFC's) which are less damaging to the ozone layer, for example difluorochloromethane, difluorochloroethane, dichlorofluoroethane or tetrafluoroethane, have recently been used to an increasing extent as blowing agents. It is also known that fluorine-containing blowing agents need not be used at all, being replaced for example by dimethyl ether, propane or isobutane.

The use of more highly fluorinated or CFC-free blowing agents or oleochemical polyols, which is actually desirable from the ecological point of view, results in hydrophobicization of the polyurethane compositions. As a result, the water which is absolutely essential for the crosslinking and curing of the polyurethane compositions to form foams is unable adequately to penetrate through the foam. This results in the formation of voids in the foam and in unwanted shrinkage of the foam after setting. To avoid this, both the substrate and the foam itself have to be thoroughly moistened during processing of the foams. Voids occur in greater numbers when the polyurethane foams are applied to dry substrates.

The formation of voids and shrinkage are technically undesirable and complicate or prevent application of the ecologically more favorable polyurethane foams.

Accordingly, the problem addressed by the present invention was to provide polyurethane foams, more especially based on oleochemical polyols and/or free from CFC-containing blowing agents, which would give fine-cell, homogeneous and substantially void-free foams without moistening of the substrate and/or the foam.

Another problem addressed by the invention was to improve the permeability of polyurethane foams to water and water vapor.

In addition, the stability of the polyurethane compositions packed in pressurized containers against precipitation, above all at low temperatures, would remain guaranteed.

DESCRIPTION OF THE INVENTION

According to the invention, the solution to this problem is characterized in that the polyols used for production are partly replaced by hydrophilic surfactants containing isocyanate-reactive functional groups.

Accordingly, the present invention relates to polyurethane compositions for the production of one-component polyurethane foams containing reaction products of polyols with a molar excess of difunctional or polyfunctional isocyanates, characterized in that 10 to 80% by weight of the polyols are replaced by nonionic surfactants containing at least one hydroxyl group.

Nonionic Surfactants

Surfactants in the context of the present invention are compounds which consist of one or more hydrophobic groups and one or more nonionic hydrophilic groups.

The hydrophobic groups are preferably optionally substituted hydrocarbon radicals. Polyethylene oxide or polyglycerol groups are mentioned as examples of nonionic hydrophilic groups.

Suitable surfactants are those which, in addition to the hydrophilic group, contain an isocyanate-reactive functional group such as, for example, fatty alcohol ethoxylates, alkylphenol ethoxylates, fatty acid amide ethoxylates, fatty acid amine ethoxylates, alkoxylated OH-functional triglycerides, alk(en)yl oligoglycosides, fatty acid glucamides or partial esters of polymerized glycerol, i.e. compounds which can be covalently incorporated in the polyurethane.

Particularly suitable surfactants are those which contain several of these functional groups in the molecule, such as for example ethoxylated castor oil containing 20 to 400% by weight and preferably 40 to 200% by weight of EO, based on non-ethoxylated castor oil, or epoxidized soybean oil ring-opened with alcohols or carboxylic acids which, after ring opening, is reacted with alkylene oxides, preferably ethylene oxide, to a content of 20 to 400% by weight and preferably 40 to 200% by weight of alkylene oxide, based on the non-alkoxylated starting product.

A surfactant produced as described in German application DE-A1 39 23 394 from epoxidized soybean oil ring-opened with fatty acid by subsequent reaction with ethylene oxide to an ethylene oxide content of 20 to 400% by weight and preferably 40 to 200% by weight, based on the non-ethoxylated starting product, is most particularly suitable.

The hydroxyl values of the surfactants according to the invention are in the range from 10 to 200 and preferably in the range from 30 to 100.

The compounds mentioned are used in quantities of 10 to 80% by weight and preferably in quantities of 20 to 50% by weight, based on the polyol, for the replacement.

Another advantage of the last of the above-mentioned surfactants according to the invention is that, surprisingly, they do not crystallize at room temperature despite their high ethylene oxide content. Accordingly, no unwanted precipitations occur in the reaction products produced from them with diisocyanates, even at low temperatures.

The other components of the polyurethane foams will now be described.

Polyols

The polyols used are typical polyethers or polyesters which are described, for example, in Ullmanns Enzyklopädie der technischen Chemie, 4th Edition, Vol. 19, pages 304 to 305, Verlag Chemie, Weinheim. In addition, oleochemical polyols obtainable by reaction of epoxidized triglycerides with alcohols and, optionally, subsequent transesterification of the reaction products on their own or with more added non-epoxidized triglyceride, are preferably used. Oleochemical polyols from the transesterification of polyfunctional polyols, such as the adduct of glycerol with ethylene oxide or polymerized glycerol with triglycerides, for example rapeseed oil, may also be used. Castor oil is another suitable oleochemical polyol. The polyols have OH values of 50 to 400 and preferably 100 to 300.

Isocyanates

Suitable difunctional or polyfunctional isocyanates are any of the products known to the expert which are typically used in polyurethane chemistry and which are described, for example, in Ullmanns Enzyklopädie der technischen Chemie, 4th Edition, Vol. 19, pages 303 to 304, Verlag Chemie, Weinheim. Aromatic difunctional or polyfunctional isocyanates are preferably used, diphenyl methane diisocyanate and/or the technical qualitities of these diisocyanates containing molecules of high functionality being particularly preferred.

Auxiliaries

The blowing agents used are preferably HCFC's, such as difluorochloromethane, difluorochloroethane, dichlorofluoroethane or tetrafluoroethane, or CFC-free blowing agents, such as dimethyl ether, propane or isobutane. However, CFC-containing blowing agents may also be used for the purposes of the invention although they are not preferred.

The polyurethane foams may contain other compounds, such as flameproofing agents, for example the tris-(chloroalkyl)-phosphates or aryl phosphates known from the prior art. The quantity in which the flameproofing agents are used is in the range from 8 to 15% by weight, based on the mixture as a whole. Suitable catalysts for accelerating the reaction are, for example, the tertiary amines known to the expert, for example 2,2'-dimorpholinodiethyl ether. Silicone oils, optionally even modified silicone oils, may be used as stabilizers.

Production and Application

The polyurethane compositions according to the invention are produced by mixing the polyols with the modifying nonionic hydrophilic surfactant, the difunctional or polyfunctional isocyanate, the blowing agent, the flameproofing agent, the catalyst and optionally the stabilizer and packing the resulting mixture in a pressurized container equipped with a spray valve.

When the pressurized mixture issues from the valve, a polyurethane foam is formed in the usual way and may be used, for example, for filling joints with foam, for insulation and the like.

COMMERCIAL APPLICATIONS

The polyurethane compositions according to the invention may be used above all in the building industry for the production of fine-cell, homogeneous, void-free or substantially void-free polyurethane foams on dry substrates without any need to moisten the foams.

The polyurethane compositions packed in pressurized containers are stable against precipitation during storage at low temperatures.

EXAMPLES

All quantities are expressed as percentages by weight, unless otherwise indicated.

General procedure:

A polyurethane composition was prepared from the following ingredients:

| | |
|---|---|
| 19.7 pbw | of an oleochemical polyol prepared by ring opening of epoxidized soybean oil with methanol and subsequent partial transesterification, OHV = 180 |
| 34.3 pbw | of Desmodur ® VKS, 31% NCO content |
| 24 pbw | of trichloropropyl phosphate |
| 19.6 pbw | of a blowing agent of $C_2H_3ClF_2$ + $CHClF_2$ |
| 1.6 pbw | of Dabco ® DC 190 |
| 0.8 pbw | of dimorpholinodiethyl ether |
| 100 pbw | of polyurethane composition |

DABCO DC 190 is a silicone surfactant manufactured by Dow Corning. Desmodur VKS is a polymeric isocyanate manufactured by Bayer AG.

The following nonionic hydrophilic surfactants were used:

Surfactant 1: ethoxylated castor oil containing 65% by weight of ethylene oxide

Surfactant 2: epoxidized soybean oil ring-opened with a mixture of $C_{6-12}$ fatty acids and subsequently reacted with ethylene oxide to an ethylene oxide content of 150% by weight, OH value=54.7.

Performance test:

The one-component polyurethane mixture was sprayed from pressurized containers into 40 mm wide and 400 mm long joints. Dry cellulose and cellulose soaked with water were used as the substrates. The quality of the foams was evaluated after curing. The polyurethane strands were then cut up in order to reveal any voids.

| | Moist substrate: | | |
|---|---|---|---|
| Example No. | 1 (Comp.) | 2 | 3 |
| Basic polyol | 100% | 70% | 70% |
| Surfactant 1 | — | 30% | — |
| Surfactant 2 | — | — | 30% |
| Foam volume | Good | Good | Very good |
| Foam structure | Inhomogeneous | Partly inhomogeneous | Homogeneous |
| Void formation | Slight | Slight | Very slight |
| Dimensional stability (shrinkage) | 6% By volume | 3% By volume | 1% By volume |

-continued

| Example No. | Dry substrate | | |
|---|---|---|---|
| | 4 (Comp.) | 5 | 6 |
| Basic polyol | 100% | 70% | 70% |
| Surfactant 1 | — | 30% | — |
| Surfactant 2 | — | — | 30% |
| Foam volume | Poor | Good | Very good |
| Foam structure | Very inhomogeneous | Partly inhomogeneous | Homogeneous |
| Void formation | Frequent | Slight | Very slight |
| Dimensional stability (shrinkage) | 10% By volume | 3% By volume | 1% By volume |

What is claimed is:

1. A polyurethane composition for the production of single-component polyurethane foams on dry or wet substrates, said composition comprising the reaction product of a polyol with a molar excess of difunctional or polyfunctional isocyanates wherein 10% to 80% by weight of said polyol has been replaced by a nonionic surfactant consisting essentially of epoxidized soybean oil ring-opened with alcohols or carboxylic acids which after ring opening has been reacted with an alkylene oxide to a content of 20% to 400% by weight of alkylene oxide, based on non-alkoxylated soybean oil.

2. A polyurethane composition as in claim 1 wherein said polyol comprises an oleochemical polyol obtained by ring-opening of epoxidized soybean oil with an alcohol, and optionally, by subsequent transesterification.

3. A polyurethane composition as in claim 1 wherein said isocyanates comprise aromatic difunctional or polyfunctional isocyanates.

4. A polyurethane composition as in claim 1 wherein said nonionic surfactant comprises the reaction product of the ring-opening of an epoxidized soybean oil with fatty acids reacted with ethylene oxide up to a content of 40% to 400% by weight, based on the weight of the non-alkoxylated ring-opening product.

5. The process of producing a fine-cell, homogeneous single-component polyurethane foam on a dry or wet substrate comprising applying to said substrate a polyurethane composition comprising the reaction product of a polyol with a molar excess of difunctional or polyfunctional isocyanates wherein 10% to 80% by weight of said polyol has been replaced by a nonionic surfactant consisting essentially of epoxidized soybean oil ring-opened with alcohols or carboxylic acids which after ring opening has been reacted with alkoxylene oxide to a content of 20% to 400% by weight of alkylene oxide based on non-alkoxylated soybean oil.

6. A process as in claim 5 wherein said polyol comprises an oleochemical polyol obtained by ring-opening of epoxidized soybean oil with an alcohol, and optionally, by subsequent transesterification.

7. A process as in claim 5 wherein said isocyanates comprise aromatic difunctional or polyfunctional isocyanates.

8. A process as in claim 5 wherein said nonionic surfactant comprises the reaction product of the ring-opening of an epoxidized soybean oil with fatty acids reacted with ethylene oxide up to a content of 40% to 400% by weight, based on the weight of the non-alkoxylated ring-opening product.

* * * * *